Dec. 7, 1948.  W. D. COCKRELL  2,455,902

CALCULATING AND AERIAL NAVIGATION INSTRUMENT

Filed Feb. 24, 1947

Inventor
William D. Cockrell;
by William G. Edwards, Jr.
His Attorney

Patented Dec. 7, 1948

2,455,902

UNITED STATES PATENT OFFICE 2,455,902

CALCULATING AND AERIAL NAVIGATION INSTRUMENT

William D. Cockrell, Schenectady, N. Y.

Application February 24, 1947, Serial No. 730,608

12 Claims. (Cl. 235—61)

My invention relates to calculating instruments and particularly to such instruments for facilitating the navigation of aircraft over land areas.

The various navigation computors in use today include many which have been designed specifically for use in the navigation of aircraft. Most of these instruments require that the navigator do some pencil work either on separate sheets or charts or on surfaces provided on the instruments for that purpose. These calculations include multiplication and the addition of various quantities to the resultant products. The necessity of using a pencil during the operation of the instrument complicates the problem especially when the computing must be done by the pilot himself during flight. Accordingly it is an object of my invention to provide an improved calculating instrument for adding to one quantity the product of two other quantities.

It is another object of my invention to provide an improved aerial navigation instrument for quickly and accurately computing navigation problems.

It is another object of my invention to provide an improved aerial navigation instrument of simple and rugged construction and which may be manipulated by one hand.

It is another object of my invention to provide an improved navigation instrument whereby computations may be made quickly and accurately without the use of a pencil or other marking device.

Further objects and advantages of my invention will become apparent as the following description proceeds and the features of novelty which characterize my invention will be pointed out with particularity in the claims annexed to and forming a part of this specification.

Figure 1:
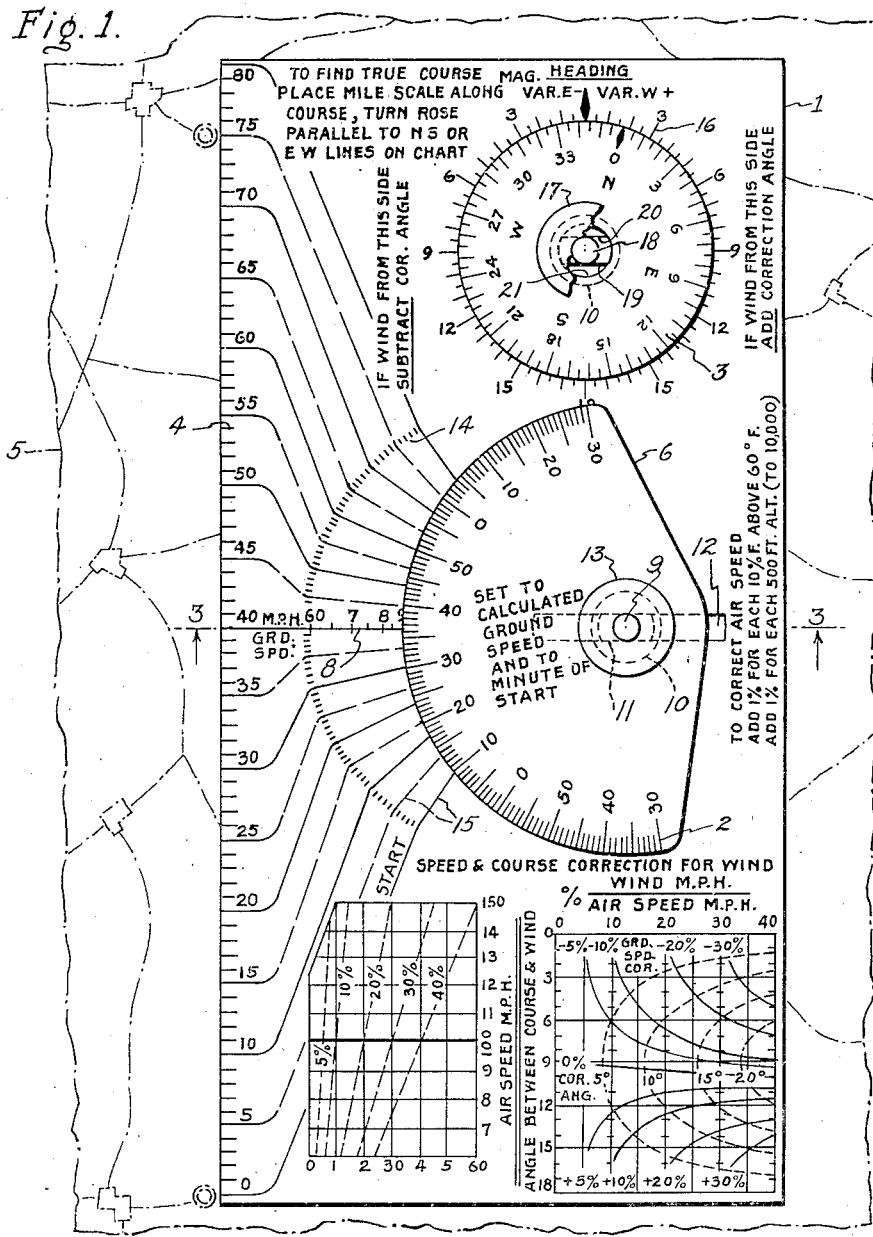
Figure 2:
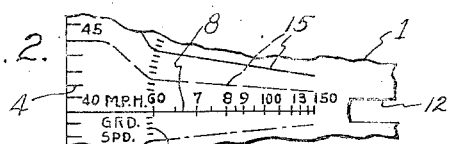
Figure 3:
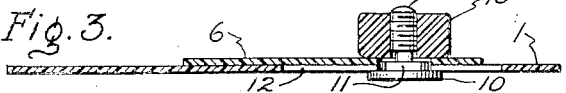

For a better understanding of my invention reference may be had to the accompanying drawing in which Fig. 1 is a plan view of a navigation instrument embodying my invention placed on a map or chart; Fig. 2 is a plan view of a portion of the instrument of Fig. 1 with one element of the instrument removed; and Fig. 3 is a sectional view along the line 3—3 of Fig. 1.

Referring now to the drawing the navigational instrument illustrated comprises a rectangular plate or board 1 having an adjustable circular scale 2 marked in units of time and a compass rose 3 mounted thereon. Along one of the straight edges of the board 1 there is provided a linear scale 4 marked in units of distance on the same scale as that employed on a suitable map or chart 5, such as the Sectional Aeronautical chart published by the U. S. Coast and Geodetic Survey, and which is to be used with the instrument; thus distances on the map may be measured directly by the scale 4. The circular scale 2 is arranged to cooperate with the linear scale 4 to calculate the distance along the map which will be covered by a plane travelling at a selected speed in a selected period of time or, conversely, the time required at the given speed to cover a selected distance. In order to accomplish this purpose the scale 2 is marked on a plate 6 which is rotatably mounted about the center of the scale and which is slidably mounted for movement along a line 8 normal to the straight edge of the board at the center of the straight scale 4. This symmetrical location of the line 8 normal to the scale 4 at its center is a preferred arrangement; it will be apparent, however, that other positions and directions of movement may be employed if desired. One suitable form of clamp or mounting as shown in Fig. 3 comprises a threaded stud 9 at the center of the circular scale having a head 10 on the bottom side of the board 1 and a raised straight sided portion 11 slidable within a slot 12 extending along the line 8; thus, the center of the circular scale 2 may be moved along the line 8. The height of the raised portion 11 is preferably slightly less than the thickness of the scale plate 6 so that a thumb nut 13 threaded on the stud 9 may be employed to clamp the plate 6 in any desired position along the slot 12 and with the scale 2 in any desired position about its center. Ground speeds within a selected range are indicated along the line 8, the minimum speed, say sixty miles per hour, being at the intersection of the circular scale 2 and the line 8 when the plate 6 is in its position nearest the linear scale 4. The units of time on the circular scale 2 are also marked along an arc 14 of the same radius as the scale 2 and intersecting the minimum speed position of the scale 2 along the line 8, so that the scale 14 appears along the circular edge of the plate 6 when the plate is in its position nearest the scale 4. The units of distance along the scale 4 are connected by lead lines to points of the scale 14 corresponding to the times required to reach the respective distances at the minimum speed. In the calculator illustrated the scale 4 is marked in miles from zero to eighty and the scales 2 and 14 in minutes over a period of two hours beginning with a thirty minute point and extending over 180° of the circular scale. In the position for a speed of sixty-miles per hour or one mile per minute, the divisions on the linear scale correspond to the divisions on the circular scale, and the elapsed time for miles traveled along the linear scale 4 may be read directly on the circular scale by setting the zero marks in register.

In order that distances covered at rates of speed other than the minimum may be calculated, a plurality of lines 15 are extended from the main divisions of the scale 14 substantially radially toward the center of the scale 14. Each of the lines 15 thus corresponds to one of the main divisions of the distance scale 4. The lines 15 are not truly radial but rather approach or converge toward the line 8 which, in the preferred arrangement illustrated, is the middle one of the lines 15. Each of the lines 15 is the locus of all points representing the times required to cover the corresponding distance at speeds within the selected range. Furthermore the loci representing the times required to reach each successive line 15, that is, each successive main division of distance, at a selected speed are all located along an arc of the same radius as the scale 2. Thus the scale 2 when set at a selected speed along the line 8 indicates the times required to travel selected distances as indicated by the radial lines 15.

In the calculator illustrated the range of ground speeds is from 60 M. P. H. to 150 M. P. H. as shown in Fig. 2 and because the linear scale 4 covers 80 miles, courses on the map may be calculated in sections up to 80 miles in length from a selected point. Point to point courses of any length may, of course, be followed merely by shifting the scale along the course.

When the calculator is being used it is placed on the map along the course to be followed. A pencil line may be drawn along the edge of the plate 1 so that the scale 4 may easily be placed along the course again after it has been moved. The zero distance point of the scale is placed at the starting point and the plate 6 is slid along the slot 12 until the scale 2 or rather the circular edge of the plate intersects the line 8 at the expected ground speed, the speed being ninety miles per hour in the illustrated position of the plate 6. The scale 2 is then rotated until the point corresponding to the starting time registers with the zero line 15. In the position illustrated the starting time is ten minutes after the hour. The plate 6 is then locked in position by tightening the thumb nut 13.

Now, if the plane travels at the expected speed, landmarks along the course may be checked on te map and the times on the operator's watch will correspond with those indicated by the scale 2. However, should the time of passing a selected landmark not be the same as that indicated by the scale 2 the actual speed is, of course, different from the expected speed and the plate 6 may be shifted to a different speed setting which results in the scale 2, while set with actual starting time at the zero line 15, reading the actual time at the selected landmark. If the speed is then maintained the new setting of the scale 2 will give a correct reading of time and will indicate the expected times of arrival at points along the course. For example, in Fig. 1 if the plane left the airport shown on the chart adjacent the zero point on scale 4 at ten minutes after the hour, as indicated, then the expected time of arrival at the airport adjacent the seventy-five mile marker is on the next hour.

It is thus apparent that I have provided an instrument which enables the pilot to read quickly from the chart not only the distance to a selected point, but also the expected time of arrival at that point, the readings being obtained merely by placing the correctly adjusted instrument on the chart along the course to be followed to measure the distance to the selected point on the scale 4 and the time on the scale 2.

The converging lines 15 and the plate 6 leave the two right-hand corners of the board 1 free of any markings or devices. This provides a suitable space for mounting the rotatable compass rose 3 in the upper right-hand corner. About the circular edge of the rose 3 there is marked on the board 1 a circular protractor scale 16 comprising two one-hundred and eighty degree scales, the center or zero line being parallel to the linear scale 4. Thus the center line of the protractor is always parallel to the course when the scale 4 is placed along the course. The true course can then be set by rotating the compass rose until the north-south line thereof lies parallel to the nearest meridian on the map. Obviously if an east-west parallel is better for setting the rose at the chosen sector of map it may be used instead of the meridian. After the true heading has been set, it may be read directly on the compass rose opposite the "Heading" marker at the zero point of the protractor scales. In most cases the pilot will wish to know his magnetic or correct compass heading; this may be obtained by correcting the true course heading for magnetic variation, compass deviation, and wind correction angle.

In order to facilitate the calculation and setting of the compass rose to include the correction for drift, suitable charts or graphs as indicated and which are well known navigation aids may be marked or printed on the board 1 in the space at the right of the scale 4 below the plate 6. The left-hand one of these charts indicates wind speed in percent air speed, and the right-hand chart indicates speed and course corrections for wind. From these charts the drift angle may be calculated when the wind direction and velocity are known, and the compass rose may be set to include necessary corrections. The rose may be locked in position by tightening a thumbscrew 17 which is threaded on a stud 18 of the same size and form as the stud 9 shown in Fig. 2. The straight sided portion of the stud 18, indicated at 19, engages a slot 20 in the board 1 and prevents rotation of the stud. The compass rose is provided with a circular opening 21 which fits the circular ends of the portion 19 so that the rose may be rotated easily when the thumb screw is released.

It is thus apparent that the instrument is of simple construction and easily adjusted, and that it may be set by tightening the thumb-screws 13 and 17 so that it can be handled without danger of unintentional changing of the setting. The instrument may be constructed of various plastics or other suitable durable materials. It may be made of a size such that it can be carried easily in a coat pocket. Only one hand is necessary to use and set the instrument, and all information necessary to normal cross country flying is made available to the pilot the additional items required being an aeronautical chart and a watch.

A further consideration of the operation of the instrument as described above will show that it may be constructed and used for calculations not necessarily related to navigation. It will be noted that the time of arrival at the destination is determined by adding to the time of departure, or to the time at a selected landmark, the lapsed time from the start or landmark to the destination. This elapsed time is the product of the distance by the reciprocal of the ground speed. Thus the time of arrival indicated on the scale 2 is the sum of one quantity and the product of two other quantities. A similar calculation may be made whereby the distance to a selected landmark is added to the distance which will be covered at the known ground speed in a selected period of time. This is accomplished by setting the zero mark on the scale 2 opposite the mark at the mileage from the start to the landmark, and then reading the point on the linear scale 4 which corresponds to the selected elapsed time on the scale 2. It is thus apparent that the instrument may be employed to add to one quantity the product of two other quantities and may be employed in calculating instruments for purposes other than navigation, by selecting the scales and locus lines in accordance with the quantities involved in the particular application.

While I have illustrated and described my invention in connection with a specific form of calculating instrument intended for use in aerial navigation, other embodiments will readily occur to those skilled in the art. I do not, therefore, desire my invention to be limited to the particular construction illustrated and I intend, by the appended claims, to cover all modifications which fall within the spirit and scope of my invention.

What I claim as new and desire to secure by Letters Patent of the United States is:

1. In a calculating instrument for adding to one quantity the product of two other quantities, a linear scale marked in units of a first quantity, a set of equally spaced substantially radial lines corresponding to points on said scale, a rotatable circular scale marked in equal linear units of a second quantity and intersecting said lines whereby any point on said circular scale may be made to register with any one of said radial lines, means affording adjustment of the axis of rotation of said circular scale along a radial line, and a scale along said last mentioned radial line marked in units of a third quantity whereby said circular scale may be positioned to intersect said last mentioned radial line at a selected value of said third quantity, said radial lines being the loci of the products of said second and third quantities which are equal to the corresponding units on said linear scale when the zero point on said circular scale lies on the radial line corresponding to the zero point on said linear scale.

2. In a calculating instrument for adding to a first quantity the product of a second and a third quantity, a flat plate having a linear scale thereon marked in units of the first quantity, and extending along a straight line, a line normal to said straight line, a scale along said normal line marked in units of the second quantity, a set of substantially radial lines corresponding to points along said linear scale and converging toward said normal line, a second plate having a circular edge portion and a scale along said edge marked in units of the third quantity, and means for mounting said second plate along said normal line for rotation about the center of said circular edge and for movement of said center along said normal line whereby any point on said circular scale may be made to register with any of said radial lines in any position of said circular edge with respect to said scale along said normal line, said radial lines being the loci of the products of said second and third quantities which are equal to the values of the corresponding points on said linear scale when the zero point on said circular edge scale lies on the radial line corresponding to the zero point on said linear scale.

3. In an aerial navigation instrument a straight scale marked in units of distance, a set of equally spaced marks extending in an arc and corresponding to equal distances along said scale, and a rotatable circular scale extending along said arc and marked in equal units of time whereby any point on said circular scale may be made to register with any one of said marks to indicate respective times for reaching successive distances at a predetermined ground speed.

4. In an aerial navigation instrument a straight scale marked in units of distance, a set of equally spaced substantially radial lines corresponding to equal distances along said scale, a rotatable circular scale intersecting said lines and marked in equal units of time whereby any point on said circular scale may be made to register with any one of said radial lines, and means affording adjustment of the axis of rotation of said circular scale longitudinally of a radial line for shifting said circular scale to positions corresponding to selected ground speeds.

5. In an aerial navigation instrument a straight scale marked in units of distance, a set of equally spaced substantially radial lines corresponding to equal distances along said scale, a rotatable circular scale intersecting said lines and marked in equal units of time whereby any point on said circular scale may be made to register with any one of said radial lines, said circular scale being mounted for movement of its pivot point along a predetermined radial path, a scale along said path representing ground speeds within a predetermined range whereby the pivot point of said circular scale may be positioned according to a selected ground speed and so that said circular scale intersects said radial lines to indicate the respective times for reaching successive distances at the selected ground speed.

6. In an aerial navigation instrument a straight scale marked in units of distance, a set of equally spaced substantially radial lines corresponding to equal distances along said scale, a rotatable circular scale intersecting said lines and marked in equal units of time whereby any point on said circular scale may be made to register with any one of said radial lines, each of said radial lines being the locus of the points representing the times required to reach the corresponding distance on said straight scale within a selected range of ground speeds, and means affording adjustment of the axis of rotation of said circular scale longitudinally of a radial line for shifting said circular scale to positions corresponding to selected ground speeds.

7. In an aerial navigation instrument a straight scale marked in units of distance, a set of equally spaced substantially radial lines corresponding to equal distances along said scale, a rotatable circular scale intersecting said lines and marked in equal units of time whereby any point on said circular scale may be made to register with any one of said radial lines, said circular scale being mounted for movement of its pivot point toward and away from said straight scale along a line normal thereto, a scale along said line representing ground speeds within a predetermined range whereby the pivot point of said circular scale may be positioned according to selected ground speeds and so that said circular scale intersects said radial lines to indicate the respective times for reaching successive distances at the selected ground speed.

8. In an aerial navigation instrument, a flat plate having a straight edge, a scale marked in units of distance along said edge, a line normal to said edge intermediate the ends thereof, a ground speed scale along said normal line, a set of substantially radial lines corresponding to equal distances along said scale and converging toward said normal line, a second plate having a circular edge portion and a scale thereon representing units of time, and means for mounting said second plate along said normal line for rotation about the center of said circular edge portion and for movement of said center along said normal line whereby any point on said circular scale may be made to register with any of said radial lines in any position of said circular scale with respect to said ground speed scale.

9. In an aerial navigation instrument a straight scale marked in units of distance, a set of equally spaced substantially radial lines corresponding to equal distances along said scale, a rotatable circular scale intersecting said lines and marked in equal units of time whereby any point on said circular scale may be made to register with any one of said radial lines, and means affording adjustment of the axis of rotation of said circular scale longitudinally of a radial line for shifting said circular scale to positions corresponding to selected ground speeds, said means including means for locking said circular scale in any selected position.

10. In an aerial navigation instrument, a flat plate having a straight edge, a scale marked in units of distance along said edge, a line normal to said edge intermediate the ends thereof, a ground speed scale along said normal line, a set of substantially radial lines corresponding to equal distances along said scale and converging toward said normal line, a slot in said plate in alignment with said normal line, a second plate having a circular edge portion and a scale thereon representing units of time, and means engaging said slot and said second member for mounting said second plate for pivoted movement about the center of said circular edge and for sliding movement along said slot whereby any point on said circular scale may be made to register with any of said radial lines regardless of the position of said second plate along said slot.

11. In an aerial navigation instrument, a flat plate having a straight edge and adapted to be placed upon a map or chart, a scale along said edge marked in units of distance corresponding to those of the map to be employed therewith, a line normal to said edge intermediate the ends thereof, a ground speed scale along said normal line, a set of substantially radial lines corresponding to equal distances along said scale and converging toward said normal line, each of said radial lines being the locus of points representing the times required to reach the corresponding distance on said straight scale from a selected starting point and with the range of speeds on said ground speed scale, a second plate having a circular edge portion and a scale thereon representing units of time, and means for mounting said second plate along said normal line for rotation about the center of said circular edge portion and for movement of said center along said normal line whereby any point on said circular scale may be made to register with any one of said radial lines in any position of said circular scale with respect to said ground speed scale.

12. In a calculating instrument for adding to a first quantity the product of second and third quantities, the third being a ratio of units of the first quantity to a unit of the second quantity, a linear scale marked in units of the first quantity, a set of equally spaced substantially radial lines corresponding to points on said scale, a rotatable scale marked in equal linear units of the second quantity and intersecting said lines whereby any point on said circular scale may be made to register with any one of said radial lines, and means affording adjustment of the axis of rotation of said circular scale along a radial line, successive positions of said axis along said radial line locating said circular scale in positions representing successive values of said third quantity, said radial lines being the loci of the products of said second and third quantities which are equal to the corresponding units on said linear scale when the zero point on said circular scale lies on the radial line corresponding to the zero point on said linear scale.

WILLIAM D. COCKRELL.

REFERENCES CITED

The following references are of record in the file of this patent:

UNITED STATES PATENTS

| Number | Name | Date |
|---|---|---|
| 1,122,429 | Schwager | Dec. 29, 1914 |
| 1,985,907 | Weems | Jan. 1, 1935 |
| 2,345,020 | Warner | Mar. 28, 1944 |